2,998,412
Patented Aug. 29, 1961

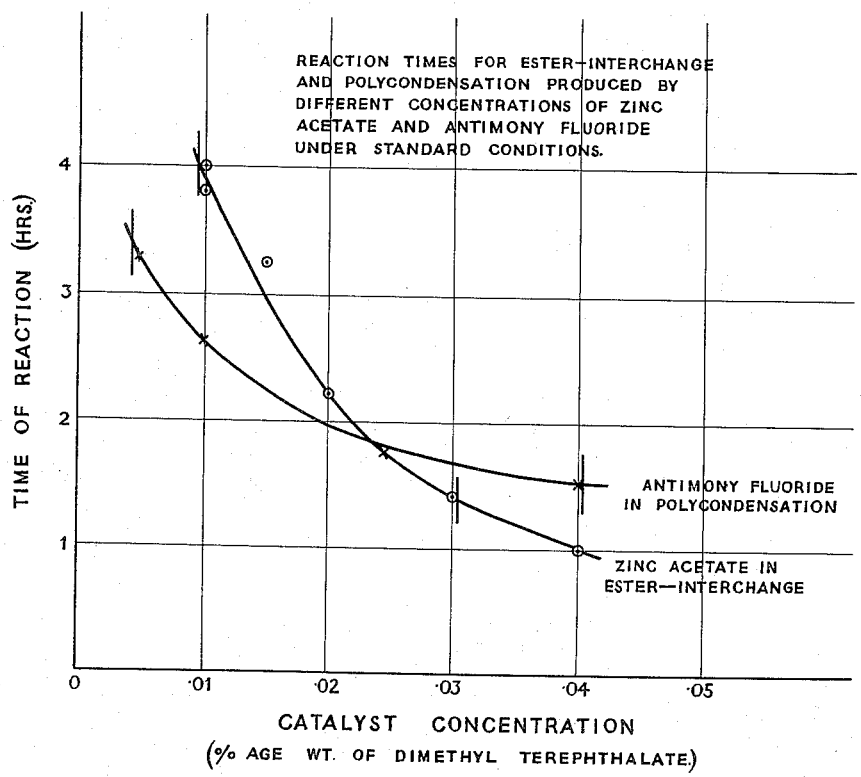

2,998,412
PROCESS FOR MANUFACTURE OF POLYETHYL-
ENE TEREPHTHALATE WITH ZINC ACETATE-
ANTIMONY TRIFLUORIDE CATALYST SYSTEM
Norman Fletcher, Harrogate, England, assignor to Imperial Chemical Industries Limited, London, England, a corporation of Great Britain
Filed May 12, 1958, Ser. No. 734,489
Claims priority, application Great Britain Feb. 27, 1953
3 Claims. (Cl. 260—75)

This invention relates to an improved process for the manufacture of polyethylene terephthalate, a synthetic linear polyester having useful fibre and film-forming properties. In particular, this invention is directed to an improved catalyst system for use in the ester-interchange reaction between a dialkyl terephthalate and ethylene glycol and in the polycondensation of the resultant glycol ester of terephthalic acid. This application is a continuation-in-part of my application, Serial No. 410,457, filed on February 15, 1954, now abandoned.

The preparation of polyesters based on terephthalic acid and a glycol of the series $HO(CH_2)_nOH$ where $n=2$ to 10 inclusive is described in U.S.P. 2,465,319. A preferred method for the preparation of polyethylene terephthalate takes place in two stages, ester-interchange between ethylene glycol and a dialkyl terephthalate being followed by polycondensation of the resultant glycol terephthalate.

The catalysis of these processes may be brought about by a wide range of metals and metal compounds. U.S.P. 2,465,319 discloses the following: lithium, sodium, potassium, calcium, beryllium, magnesium, zinc cadmium, aluminium, chromium, molybdenum, manganese, iron, nickel, copper, silver, mercury, tin, lead, bismuth, antimony, platinum, palladium, alkali metal alcoholates, alkaline earth metal alcoholates, magnesium alcoholates, alkali metal carbonates, alkali metal borates, magnesium oxide.

A large number of U.S. patents relating to specific catalysts or catalyst combinations have since been filed. Their claims may be summarized as follows:

U.S.P 2,518,283—Zinc borate for both stages.
U.S.P. 2,534,028—Litharge for both stages.
U.S.P. 2,578,660—Germanium and germanium oxide for polycondensation.
U.S.P. 2,641,592—Cobaltous acetate for both stages.
U.S.P. 2,643,989—Cerium and cerium oxides for both stages.
U.S.P. 2,647,885—Antimony trioxide for polycondensation.
U.S.P. 2,650,213—Litharge/antimony trioxide/triphenyl phosphite for both stages.
U.S.P. 2,681,360—Mixed lithium hydride-metal organic carboxylate for ester-interchange.
U.S.P. 2,711,402—Aluminates for polycondensation.
U.S.P. 2,729,620—Neodymium chloride for both stages.
U.S.P. 2,739,957—Calcium compound for ester-interchange. Calcium compound/antimony compound for polycondensation.
U.S.P. 2,740,768—Basic ferric acetate for both stages.
U.S.P. 2,820,023—Lanthanum compounds for both stages.

The foregong list shows the wide scope of the work carried out in this field in which the main aims have been to achieve rapid rates of reaction and improved polymer quality, notably colour. These aims have often been conflicting, a fundamental difficulty being that rapid reaction has tended to give discoloured polymers. It is therefore apparent that the choice of a catalyst system must involve some measure of compromise.

Apart from their influence on rate of ester-interchange and polycondensation it is particularly important to consider the effect of metal compounds on thermal stability since these compounds remain in the polymer. Subsequent processing operations such as the spinning of fibres and casting of films are carried out from the polymer melt at elevated temperatures and high thermal stability facilitates process control and minimises colour deterioration during such operations. We have found that the thermal stability of polyethylene terephthalate may be conveniently measured by rate of fall of intrinsic viscosity at a standard temperature preferably 282° C. and may be expressed as a degradation rate constant.

A useful catalyst is one which satisfies all of four of the criteria set out below.

(1) Rates of reaction. These must allow a high rate of productivity and the rates of ester-interchange and polycondensation should be such as to keep the two steps in phase under conditions of routine manufacture.

(2) Polymer colour. Not only must the polymer be as clear a colour as possible but if it is to be spun into textile yarns, these must be of a colour satisfactory to the textile trade.

(3) Polymer stability. A low degradation rate should be obtained when the polymer is heated in the molten state.

(4) Solubility characteristics. The catalyst must be soluble in the reaction mixture and in the polymer. Ready solubility in ethylene glycol in a minimum requirement.

We have found that antimony trifluoride is of outstanding value in respect of polymer colour, stability and solubility characteristics. Unfortunately, however, under atmospheric pressure conditions it catalyses only the polycondensation step in which it is capable of producing useful rates of reaction when present in concentrations between 0.005% and 0.04% by weight of ester. Above this level of concentration little further advantage is gained when the reaction is carried out in a conventional autoclave and the presence of large amounts of antimony can have a deleterious effect on polymer colour. In view of the limitation of the effect of antimony fluoride to polycondensation it is necessary to combine the fluoride with another metal compound which will catalyse ester-interchange. For this purpose we have found zinc acetate most suitable since it is readily soluble in cold ethylene glycol and, in small quantities, has little adverse effect on polymer stability. In order to give a rate of ester-interchange equivalent to that of polycondensation using antimony trifluoride it is desirable to use zinc acetate in concentration 0.01–0.03% by weight of ester. In defining this concentration the fact that such concentrations of zinc acetate have also a small positive catalytic effect on polycondensation has been taken into account.

The combined catalyst compounds may be added in solution in the cold ethylene glycol charge to the ester-interchange reaction antimony trifluoride having no adverse effect on the rate of this reaction. In this respect our system shows an advantage over that if Vodonik (U.S.P. 2,681,360) in which the presence of antimony trioxide is found to retard the ester-interchange step.

Our experiments show that such a zinc acetate-antimony trifluoride catalyst yields polymer markedly superior in respect of colour and stability to that containing compounds of lead, iron, cobalt, rare earth metals and alkali metals. The introduction of lithium compounds facilitates ester-interchange but is deleterious to polymer stability. While zinc compounds alone may be used to catalyse both stages a relatively high concentration (>0.05%) is required to give a reasonable rate of polycondensation and at these levels stability and colour both suffer considerable deterioration. Moreover, ester-interchange and polycondensation rates are badly out of phase. Among the compounds disclosed as catalyst in the prior art only certain calcium-antimony combinations (U.S.P. 2,739,957) give results at all comparable to those obtained with zinc acetate-antimony fluoride. The presence of calcium compounds, however, results in the precipitation of insoluble calcium salts during polycondensation and this produces an undesirable cloudiness in the polymer.

In the examples which follow the basic procedure for the testing of catalysts was as follows (all parts are by weight):

100 parts dimethyl terephthalate and 70 parts ethylene glycol were melted together in an ester-interchange apparatus consisting of a glass flask fitted with a short fractionating column leading via a distillation head to a condenser and graduated receiver. Thermometers were provided to measure temperature in the reaction flask and in the stillhead. The catalyst under examination was stirred with 1 part ethylene glycol at 140–150° C. and its state of dissolution or otherwise noted before addition to the reactants. Ester-interchange was then carried out over a temperature gradient rising to 215° C.; the point at which distillation of methanol commenced being observed. Progress of the reaction was followed by means of the amount of methanol collected.

The ester-interchange products were next charged to a stainless steel autoclave fitted with a stirrer and condenser-receiver arrangement attached to a vacuum pump. Excess glycol was allowed to distil out under atmospheric pressure while the temperature rose to 245° C. and under a pressure gradually reduced to 1 mm. Hg while the temperature rose from 245 to 275° C. Polycondensation was then carried out at 275 to 278° C. and pressure 0.2 to 0.5 mm. Hg to yield polyethylene terephthalate having an intrinsic viscosity measured in 1% solution in ortho-chlorophenol at 25° C. of about 0.70. The extent of polycondensation was determined by increase in power required to turn the stirrer ($\Delta P$), time of polycondensation being that from 275° C./1 mm. to completion. The polyethylene terephthalate was extruded from the autoclave on to water cooled nip rollers and so obtained as a quenched (amorphous) ribbon.

The polymer was assessed for clarity and for colour on an arbitrary scale 0–4 where 0=water white, 1=very slight amber tint, 2=very pale amber, 3=pale amber, 4=amber.

Prior to determination of the thermal stability the polymer ribbon is broken up and dried at 160° C. and 0.2% relative humidity to give a small constant residual moisture content (e.g. $y\%$ by weight). The effect of this moisture which cannot be completely removed in molten polymer is given by the equation:

$$\frac{y}{\frac{1}{1800k^{\frac{1}{\alpha}}}} = \frac{1}{\eta_x^{\frac{1}{\alpha}}} - \frac{1}{\eta_0^{\frac{1}{\alpha}}}$$

where $k$ and $\alpha$ are the constants in the relationship between intrinsic viscosity and number average molecular weight ($\eta = k\text{Mn}^\alpha$). These constants may be determined experimentally in a number of ways such as the end-group method of Griehl and Neue, Faserforsch. und Text., 1954, 5, 423.

$\eta_0$ = initial intrinsic viscosity.

$\eta_x$ = intrinsic viscosity after hydrolytic degradation (on remelting).

From this equation we can calculate what the intrinsic viscosity of our dried polymer will be immediately it is remelted. Thermal stability is then measured by holding molten polymer at 282° C. for varying lengths of time in an inert atmosphere under carefully controlled conditions and recording fall in intrinsic viscosity. A mean value for $K_s$, the degradation rate constant, is then obtained using the formula:

$$K_s t = M_0 k^{\frac{1}{\alpha}} \left[ \frac{1}{\eta_t^{\frac{1}{\alpha}}} - \frac{1}{\eta_x^{\frac{1}{\alpha}}} \right]$$

where $M_0$ = the polymer repeat unit (192)
$\eta_x$ = intrinsic viscosity at zero time.
$\eta_t$ = intrinsic viscosity after time $t$.
$t$ = time (hours)

The table of examples which follows shows the results obtained with a considerable number of catalyst systems, the attached FIG. I being taken from Examples 1 to 7 in order to further illustrate the effects. On this graph the vertical lines indicate the limits of concentration of catalyst within which it is reasonable to operate.

| Catalyst System (percent wt. of dimethylterephthalate) | | Solubility in Ethylene Glycol | Initial Ester-interchange Temp. (° C.) | Ester-interchange Time (hrs.) | Polycondensation Time (hrs.) | Polymer Colour | Polymer stability $K_s \times 10^3$/ hr.$^{-1}$ |
|---|---|---|---|---|---|---|---|
| | Percent | | | | | | |
| Zinc acetate | 0.04 | ++ | 160 | 1.0 | 1.5 | 1.25 | 1.8 |
| Antimony trifluoride | 0.04 | | | | | | |
| Zinc acetate | 0.03 | ++ | 160 | 1.4 | 1.5 | 0.75 | 1.75 |
| Antimony trifluoride | 0.04 | | | | | | |
| Zinc acetate | 0.02 | ++ | 160 | 2.2 | 1.8 | 0.5 | 1.6 |
| Antimony trifluoride | 0.025 | | | | | | |
| Zinc acetate | 0.015 | ++ | 160 | 3.25 | 1.8 | 0.5 | 1.6 |
| Antimony trifluoride | 0.025 | | | | | | |
| Zinc acetate | 0.01 | ++ | 160 | 3.8 | 2.6 | 0.5 | 1.4 |
| Antimony trifluoride | 0.01 | | | | | | |
| Zinc acetate | 0.01 | ++ | 160 | 3.8 | 3.3 | 1.0 | 1.4 |
| Antimony trifluoride | 0.005 | | | | | | |
| Zinc acetate | 0.01 | ++ | 160 | 4.0 | Incomplete reaction. | 1.75 | 1.7 |
| Antimony trifluoride | 0.003 | | | | | | |
| Zinc acetate | 0.015 | ++ | 160 | 3.25 | 2.0 | 0.75 | 1.6 |
| Antimony acetate | 0.034 | | | | | | |
| Calcium acetate | 0.08 | ++ | 160 | 3.75 | 2.3 | 2, cloudy | 1.9 |
| Antimony trichloride | 0.02 | | | | | | |
| Calcium acetate | 0.08 | ++ | 160 | 3.9 | 2.35 | <1, cloudy | 1.1 |
| Antimony trifluoride | 0.02 | | | | | | |
| Lithium hydride | 0.01 | ++ | 140 | 0.66 | 1.4 | 1.75 | 2.5 |
| Zinc acetate | 0.04 | | | | | | |
| Antimony trifluoride | 0.04 | | | | | | |
| Litharge | 0.02 | +− | 155 | 2.5 | 3.2 | 4 | 3.9 |
| Basic ferric acetate | 0.05 | + | 165 | 4.0 | Incomplete reaction. | >4 | 3.5 |
| Cobaltous acetate | 0.1 | + | 140 | 3.0 | 1.8 | 3 | 2.4 |
| Ceric oxide | 0.01 | +− | 185 | 4.2 | 2.0 | 1.75 | 1.8 |
| Antimony trifluoride | 0.01 | | | | | | |

See footnotes at end of table.

| Catalyst System (percent wt. of dimethylterephthalate) | | Solubility in Ethylene Glycol | Initial Ester-interchange Temp. (°C.) | Ester-interchange Time (hrs.) | Polycondensation Time (hrs.) | Polymer Colour | Polymer stability $K_s \times 10[/hr.^{-1}$ |
|---|---|---|---|---|---|---|---|
| Lanthanum oxide ($La_2O_3$) | Percent 0.03 | +− | 180 | 1.5 | Incomplete reaction. | 4 | 2.45 |
| Lanthanum oxide | 0.01 | +− | 185 | 3.0 | 2.8 | 2.25 | 2.0 |
| Germanium dioxide | 0.01 | | | | | | |
| Potassium borate | 0.02 | + | 140 | 3.25 | 2.0 | 2.5 | 3.1 |
| Antimony trifluoride | 0.02 | | | | | | |
| Lithium hydride | 0.01 | | | | | | |
| Zinc acetate | 0.02 | − | 145 | 1.1 | 1.95 | 1.25G | 2.75 |
| Antimony trioxide | 0.03 | | | | | | |
| Zinc acetate | 0.02 | − | 160 | 2.2 | 2.1 | 0.75G | 1.7 |
| Antimony trioxide | 0.03 | | | | | | |
| Calcium oxide | 0.1 | − | 175 | 4.0 | 2.45 | 1.0, cloudy | 1.2 |
| Antimony trioxide | 0.03 | | | | | | |
| Zinc acetate | 0.04 | ++ | 160 | 1.0 | Incomplete reaction. | 3.0 | 2.0 |
| Zinc acetate | 0.05 | ++ | 155 | 1.0 | 5.4 | 2.25 | 2.0 |
| Zinc acetate | 0.08 | ++ | 150 | 0.6 | 4.0 | 2.0 | 2.6 |
| Zinc borate | 0.05 | ++ | 160 | 0.85 | 4.4 | 2.5 | 1.9 |

NOTES:
(1) In column 2 the symbols ++ denote ready solubility in cold glycol; +− soluble only on heating; − indicates limited solubility or insolubility.
(2) Where incomplete polycondensation reaction is noted this means that the power imput to the agitator levelled out before intrinsic viscosity 0.7 was reached and remained steady for at least one hour.
(3) In Examples 19 and 20 the suffix G in polymer colour denotes a grey shade.

Consideration of these data will show that best results are obtained using zinc acetate and antimony trifluoride in concentrations between 0.02% and 0.025%.

It will, therefore, be seen from the above discussion and the graph that this invention contemplates a process for making highly polymeric polyethylene terephthalate which comprises reacting ethylene glycol and dimethyl terephthalate at a temperature of from 150 to 225° C. in the presence of zinc acetate in amounts between about 0.01% and 0.03% by weight of dimethyl terephthalate and thereafter polycondensing the ethylene glycol terephthalate at a temperature of from 225 to 285° C. and pressure from 0.02 to 2 millimeters of mercury in the presence of antimony trifluoride in amounts between about 0.005% and 0.04% by weight of dimethyl terephthalate till a polyester having an intrinsic viscosity of at least 0.55 is obtained.

I claim:

1. The process for making highly polymeric polyethylene terephthalate which comprises reacting ethylene glycol and dimethyl terephthalate in a temperature of from 150 to 225° C. in the presence of zinc acetate in amounts between 0.01% and 0.03% by weight of dimethyl terephthalate and thereafter polycondensing the ethylene glycol terephthalate at a temperature of from 225 to 285° C. and pressure from 0.02 to 2 millimeters of mercury in the presence of antimony trifluoride in amounts between 0.005% and 0.04% by weight of dimethyl terephthalate until a polyester having an intrinsic viscosity of at least 0.55 is obtained.

2. The process of claim 1, wherein the concentration of zinc acetate and antimony trifluoride are each about 0.025% by weight of dimethyl terephthalate.

3. The process of claim 1, wherein both zinc acetate and antimony trifluoride are present throughout both ester-interchange and polycondensation.

References Cited in the file of this patent

UNITED STATES PATENTS 2,681,360    Vodonik    June 15, 1954
2,739,957    Billica et al.    Mar. 27, 1956